United States Patent
Kuhr et al.

(10) Patent No.: US 9,727,738 B1
(45) Date of Patent: Aug. 8, 2017

(54) PATCH VALIDATION VIA REPLAY AND REMEDIATION VERIFICATION

(71) Applicant: SYNACK, INC., Redwood City, CA (US)

(72) Inventors: Mark G. Kuhr, Palo Alto, CA (US); Patrick Wardle, Maui, HI (US)

(73) Assignee: Synack, Inc., Redwood City, CA (US)

( * ) Notice: Subject to any disclaimer, the term of this patent is extended or adjusted under 35 U.S.C. 154(b) by 0 days.

(21) Appl. No.: 15/177,202

(22) Filed: Jun. 8, 2016

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/57 | (2013.01) |
| H04L 29/08 | (2006.01) |
| H04L 29/06 | (2006.01) |
| G06F 21/55 | (2013.01) |

(52) U.S. Cl.
CPC .......... *G06F 21/577* (2013.01); *G06F 21/552* (2013.01); *H04L 63/1466* (2013.01); *H04L 67/02* (2013.01); *G06F 2221/033* (2013.01)

(58) Field of Classification Search
CPC ........ G06F 21/50–21/554; G06F 21/56; G06F 21/566; G06F 21/57; G06F 21/577; G06F 2221/033; G06F 2221/03; H04L 63/14–63/1433; H04L 63/1441
See application file for complete search history.

(56) References Cited

U.S. PATENT DOCUMENTS

| | | | | |
|---|---|---|---|---|
| 8,621,613 B1* | 12/2013 | McClintock | ............ | G06F 21/56 726/22 |
| 9,015,847 B1* | 4/2015 | Kaplan | ............... | H04L 63/1433 726/25 |
| 2002/0016920 A1* | 2/2002 | Komura | .................. | G06F 21/00 726/26 |
| 2009/0144827 A1* | 6/2009 | Peinado | .............. | H04L 63/1433 726/25 |
| 2009/0307600 A1* | 12/2009 | Arthur | .................. | G06F 3/1454 715/740 |

(Continued)

*Primary Examiner* — Daniel Potratz
(74) *Attorney, Agent, or Firm* — Hickman Palermo Becker Bingham LLP

(57) ABSTRACT

A method and apparatus for patch validation via replay and remediation verification is provided. A method comprises: receiving, from a researcher computer, a report of a potential vulnerability that the researcher computer identified in a computer program application that the researcher computer accessed via a first web browser, the report comprising a record of actions performed by the researcher computer, a first outcome of the actions, and Document Object Model (DOM) events that the application outputted when the record of actions was generated; automatically generating an executable script from the record of actions, wherein the executable script, when executed, causes the web browser to perform the actions that are recorded in the record of actions; verifying the report of the potential vulnerability by executing the executable script in a second web browser and determining that a second outcome of the actions matches the first outcome that was recorded in the record of actions; determining that the first outcome of the actions is associated with a security vulnerability.

14 Claims, 7 Drawing Sheets

(56) References Cited

U.S. PATENT DOCUMENTS

| | | | | |
|---|---|---|---|---|
| 2010/0332550 | A1* | 12/2010 | Ainslie | G06F 21/316 707/802 |
| 2012/0260344 | A1* | 10/2012 | Maor | G06F 11/3688 726/25 |
| 2014/0075563 | A1* | 3/2014 | Simpson | G06F 21/577 726/25 |
| 2014/0283083 | A1* | 9/2014 | Gula | H04L 63/1433 726/25 |
| 2015/0363595 | A1* | 12/2015 | Klein | G06F 21/554 726/23 |
| 2016/0259943 | A1* | 9/2016 | Murthy | G06F 8/68 |
| 2016/0314302 | A1* | 10/2016 | Sabetta | G06F 21/577 |

\* cited by examiner

PATCH VALIDATION VIA REPLAY AND REMEDIATION VERIFICATION

FIELD OF THE DISCLOSURE

The present disclosure generally relates to computer-implemented techniques to improve online security of web applications and, more specifically, to reporting and validating security vulnerabilities. Portions of the present disclosure relate to verification of software patches that are generated to remove a vulnerability, or to cause a web browser to operate in such a way that the vulnerability is not exposed to the user.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online web applications, such as applications that execute at a server computer and are accessed via a web browser over a network, may be vulnerable to fraudsters, hackers, or other wrongdoers. These vulnerabilities may result in theft of the private information of users and use of such information for nefarious purposes. For example, usernames, passwords, credit card numbers, social security numbers, addresses, and others sensitive information may be stolen. The stolen information can be used to make fraudulent purchases, to steal the identity of victims, or to distribute malicious code on the web.

Security researchers have been deployed to investigate online web applications and identify vulnerabilities before they are exploited. In existing environments, security researchers manually generate a report that includes the steps that have been taken to expose a vulnerability and/or to exploit the vulnerability. The report includes a detailed description of the steps taken by the researcher in the online web application and is time-consuming to prepare.

To validate a report of a particular vulnerability, in some approaches another researcher reviews the report and manually performs the steps detailed in the report. Because another researcher validates the vulnerability, there can be a significant delay between when the report is received and when the vulnerability is validated. Further, because the researcher is validating the report, the researcher is not actively identifying other vulnerabilities, giving wrongdoers a longer window of opportunity to exploit existing not yet detected vulnerabilities.

DETAILED DESCRIPTION

Figure 1:
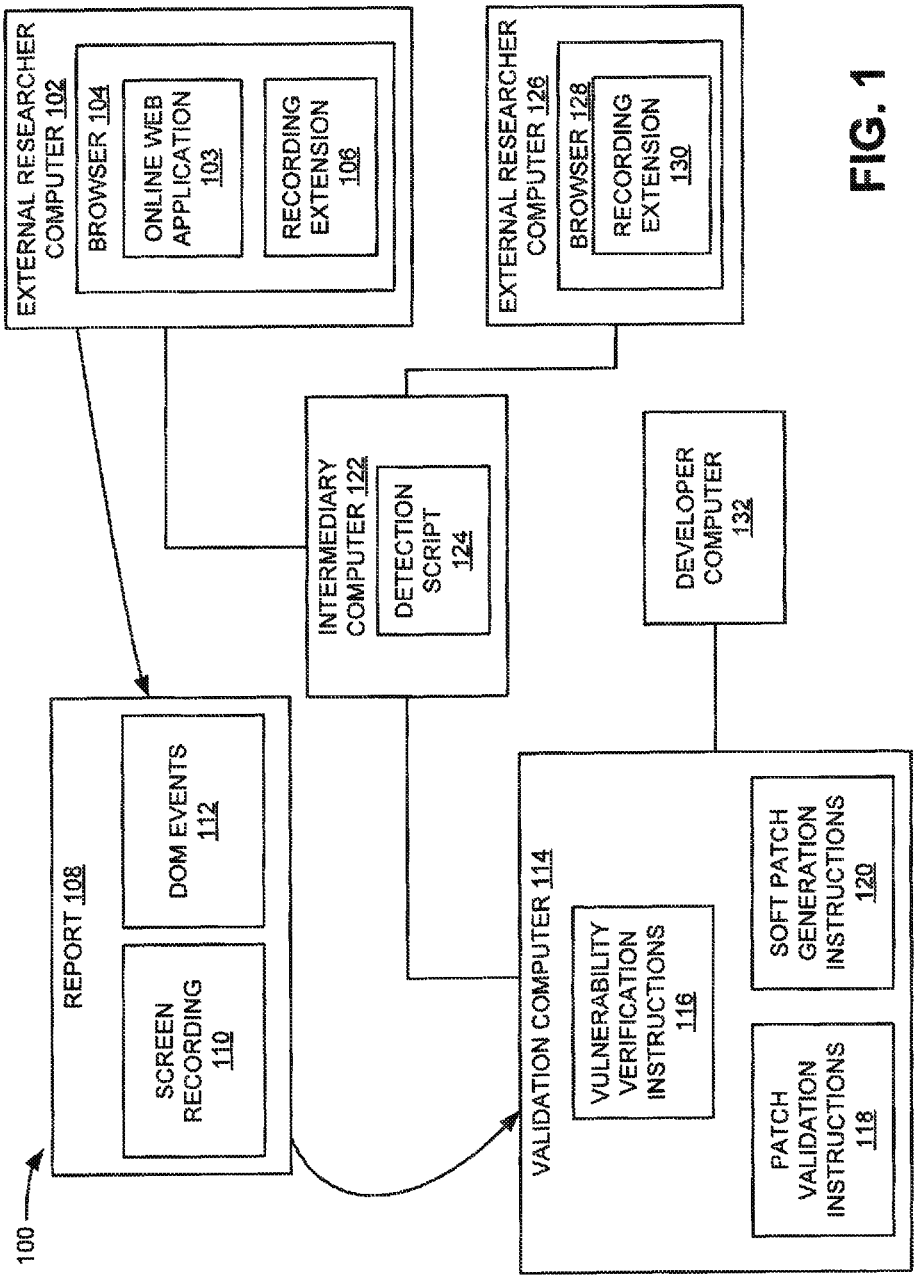
FIG. 1 is a diagram of a networked environment in which one or more embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. GENERAL OVERVIEW
2. SYSTEM OVERVIEW
3. METHOD OVERVIEW
4. IMPLEMENTATION EXAMPLE—HARDWARE OVERVIEW

1. General Overview

To streamline validation and, ultimately, patching, of a security vulnerability in an online web application, in an embodiment, a computer system and computer-implemented method allow a researcher to report a vulnerability by recording a series of actions performed within a browser. While recording the researcher's actions, a browser extension records document object model (DOM) events, Application Program Interface (API) requests, and/or network traffic that are outputted by the browser. The recording then can be replayed in another instance of the browser to verify the existence of a security vulnerability.

Once the vulnerability is verified, a software patch may be provided by a third party system that may potentially remedy or close the security vulnerability, making it inaccessible to website visitors or users of the online web application. To validate that the patch removes the security vulnerability, the recording of the researcher's actions is replayed again. If a result at the end of the playback is the same, the patch has not successfully removed the vulnerability. If the result at the end of the playback is different, the patch is considered to successfully remove the vulnerability.

In some instances, before a patch is available, a detection script, or "soft patch", may be generated and deployed for researchers who are investigating vulnerabilities associated with the online web application. The detection script may be implemented at an intermediary computer and may cause packets sent to a browser used by a researcher to be dropped in response to detecting certain actions known to be associated with a security vulnerability. The detection script may be generated from the recording of the researcher's actions exposing the security vulnerability.

In one embodiment, a data processing method comprises receiving, from a researcher computer, a report of a potential vulnerability that the researcher computer identified in a computer program application that the researcher computer accessed via a first web browser, the report comprising a record of actions performed by the researcher computer, a first outcome of the actions, Document Object Model (DOM) events, API requests, and/or network traffic that the application outputted when the record of actions was generated; automatically generating an executable script from the record of actions, wherein the executable script, when executed, causes the web browser to perform the actions that are recorded in the record of actions; verifying the report of the potential vulnerability by executing the executable script in a second web browser and determining that a second outcome of the actions matches the first outcome that was recorded in the record of actions; determining that the first outcome of the actions is associated with a security vulnerability.

In another embodiment, a data processing method comprises receiving, from a first researcher computer, a report of a security vulnerability that was identified in a computer program application that the first researcher computer accessed via a first web browser, the report comprising a record of actions performed by the first researcher computer, Document Object Model (DOM) events, API requests, and/or network traffic that the application outputted when the record of actions was generated; automatically generating a detection script comprising a set of requests associated with the security vulnerability from the record of actions, wherein the detection script, when executed by an intermediary computer that is between a network and a second researcher computer, causes the intermediary computer to detect that the second researcher computer is performing actions that are recorded in the record of actions in the application accessed via the first web browser, and, in response, causing the intermediary computer to drop at least some network traffic that is forwarded in the network toward the second researcher computer; sending the detection script to the intermediary computer.

Other aspects and features of various embodiments will become apparent from other sections of the description.

2. System Overview

FIG. 1 is a diagram of a networked environment 100 in which one or more embodiments may be implemented. In the example of FIG. 1, a networked environment 100 comprises one or more computing devices programmed as special purpose machines that communicate via one or more electronic networks such as any of local area networks (LANs), Wide Area Networks (WANs), and/or internetworks such the public Internet. The environment 100 may include computing devices that are operated, hosted by or associated with various different entities or persons, such as an online security provider, a security researcher, and a web application provider. The environment 100 includes computers that are programmed for the recording of a security vulnerability such that the security vulnerability can be replayed automatically to verify the vulnerability exists, to validate available software patches, and/or to generate a detection script to remove the vulnerability from the browsers associated with other researchers, as further described in other sections.

In an embodiment, external researcher computer 102 comprises a computing device that is associated with a human researcher who investigates online web applications for security vulnerabilities. The researcher may have specialized knowledge about online web applications and/or online security. In some instances, the researcher may be instructed to investigate a particular online web application for security vulnerabilities and/or for particular types of security vulnerabilities. The researcher may be rewarded for each security vulnerability identified that has not been previously identified by another researcher.

The external researcher computer 102 is connected to a network, such as the Internet, and accesses online web applications 103 from the Internet 105 using a browser 104. The browser 104 may be any web browser commercial, open source, or privately programmed browser that is compatible with HTML and HTTP, such as the CHROME browser by Google, Inc. of Mountain View, Calif.; the FIREFOX browser by Mozilla, Inc. of San Mateo, Calif.; the INTERNET EXPLORER browser by Microsoft of Redmond, Wash.; and the SAFARI browser by Apple, Inc. of Cupertino, Calif. The browser 104 may be a mobile version of the browser or a desktop version of the browser.

The browser 104 supports web applications 103 that use the browser as a client without disrupting and installing software on the external researcher computer 102. The web application may comprise one or more executable programs or scripts that are hosted using an application server computer coupled to the internet 105. A web site also may be considered to be a web application if it has some functionality that is similar to the functionality of a desktop software application or mobile application. In an embodiment, the web application 103 is a computer program application that is written in a language such as Java, JavaScript, DHTML, Flash, Python, Go, C++, Silverlight, or another programming language. Websites may utilize HTML5 to implement online web applications. Examples of online web applications include, but are not limited to, email, teleconferencing, online shopping, online banking, online gaming, and online navigation services.

Within the browser 104, a recording extension 106 is programmed to record actions that are performed by a researcher to expose a security vulnerability. Actions, as further described herein, may include keystrokes, selection of user interface elements using a pointing device such as a mouse or trackball, and/or gestures or taps on a touch screen. The external researcher computer 102 may investigate an online web application without recording use actions until a security vulnerability is found. The security vulnerability may be exposed by, for example, providing executable script as an input, as in a cross-site scripting attack. In other instances, the security vulnerability may be exposed by inputting random characters into input fields, a technique known as fuzzing. Other techniques may include selecting options out of order, changing values in HTML code used to generate the web page, or uploading executable code that can interact with the online web application.

The recording extension 106 is a browser extension comprising executable instructions that, when executed by the browser 104, cause the recording extension 106 to generate a report 108 by recording the actions of the researcher as a screen recording 110 and as Document Object Model (DOM) events 112. The report may further include API requests and/or network traffic. In an embodiment, recording extension 106 continually runs in the background of the browser 104 and in some embodiments the researcher may control when recording is turned on and off. The recording extension 106 may be associated with an interface element such as a pop-up window having one or more buttons such as a record button and a stop button.

In some embodiments, the researcher computer 102, using the browser 104, interacts with an online web application and identifies a potential security vulnerability by performing one or more actions to expose the potential security vulnerability. The researcher computer 102 then reloads the browser 104 and the online web application 103 to restart the web application at an appropriate starting point, such as a login page or beginning interface in the online web application. The researcher computer 102 then initiates generation of the report 108 via the recording extension 106. The recording extension 106, running concurrently in the browser 104 with the online web application 103, captures the screen recording 110 and the DOM events 112. The researcher computer 102 re-performs the actions that expose the security vulnerability then, when the vulnerability is exposed, stops the recording extension 106.

In other embodiments, the recording extension 106 may run continuously in the browser 104 while the researcher computer 102 is interacting with the online web application. When the researcher computer 102 identifies a potential security vulnerability, the researcher may review the report 108 generated. The researcher computer 102 then identifies a portion of the report 108 containing the actions that result in the exposure of the security vulnerability and generates a final report 108 containing only that portion.

The screen recording 110, in one embodiment, comprises a series of digital screen images that depict displays generated by the web browser 104 and/or the online web application 103 at various points in time while the researcher computer 102 is interacting with the online web application. The screen recording may include, or be associated with, a stored set of state data that may record a state of the online web application 106, x-y coordinates of user interface elements, inputs or keypresses provided by the researcher, a gesture input, changes in a user interface, sounds output from the browser 104 and/or online web application 106, or other inputs or outputs that occurred during interaction of the researcher computer 102 with the web application.

The DOM events 112 are outputted by the browser and are records of actions taken within the online web application 106 and/or browser 104 in association with a user interface element. The user interface element may be a location on the user interface, a link, a button, a text field, a scroll bar, or other UI widget. The action may include, for example but not limited to, a click, a double click, mouse down, mouse up, drag, drop, key press, load, unload, resize, scroll, select, change, and reset. The recorded DOM events 112 included in a report 108 may be each associated with a timestamp indicating a time at which the event occurred.

API requests and/or network traffic that are recorded may be included in the report 108. Examples of API requests that may be included include URLs and sequences of HTTP requests, etc). The URLs may include parameterized URLs carried in an HTTP call that would be interpreted on the server side as an API call. HTTP calls that may be recorded include POST, GET, PUT, PATCH, and DELETE. These calls correspond to create, read, update, and delete (or CRUD) operations, respectively. The network traffic may include network communications such as TCP or UDP communications that can be reproduced.

The recording extension 106 may record additional data to be included in the report 108. For example, the recording extension 106 may include additional script that detects, hooks, and reports alerts, such as pop-up windows. The recording extension 106 may further capture changes in Uniform Resource Locators (URLs), new URLs, and new tabs or windows opened to new URLs.

The external researcher computer 102 sends the report 108 to a validation computer 114 that is programmed to perform the validation operations that are further described herein. The validation computer 114 may be operated by, for example, an online security provider that provides security services to online web application developers, but the validation computer 114 also may be associated with other entities in other embodiments. The validation computer 114 is performs tests, checks and other tasks using the screen recording 110 and the DOM events 112 included in the report 108. The validation computer 114 may be a single computer or multiple computers that communicate via a network. The functionalities of the validation computer 114 may be provided via, for example, a cloud infrastructure.

Vulnerability verification instructions 116 receives the report 108 and converts the screen recording 110 and the DOM events 112 into a test file. The test file is a set of instructions that can be executed within the browser 104 to perform the actions records by the researcher when generating the report 108. The test file may be created using a scripting language such as JavaScript that is compatible with a script language interpreter that is integrated into the browser 104. In some embodiments, the test file is a CasperJS or PhantomJS test file.

To illustrate a specific example, a JSON file containing the DOM events 112 corresponding to a search for the term "synack" in a search engine web application is reproduced below:

```
$ less events.json
[
    {
        "type": "url",
        "data": "http://www.bing.com/",
        "timestamp": 1440817735517
    },
    {
        "type": "keydown",
        "data": {
            "type": "keydown",
            "documentURI": "http://www.bing.com/",
            "targetClass": "b_searchbox",
            "targetID": "sb_form_q",
            "keyCode": 83,
            "altKey": false,
            "shiftKey": false,
            "ctrlKey": false
        },
        "timestamp": 1440817738565
    },
    . . .
]
```

Vulnerability verification instructions 116 uses this file to generate a CasperJS test file, reproduced below:

```
$ python testBuilder.py events.json
    ->wrote CasperJS test to events.js
$ less event.js
casper.test.begin('Exploit Replay', function suite(test) {
    casper.start("http://www.bing.com/", function( ){
        test.comment('loading initial URL->http://www.bing.com/');
        this.test.assertUrlMatches("http://www.bing.com/");
    });
    casper.then(function( ) {
        test.comment('sending keypress->S');
        this.sendKeys('body', 'S');
    });
    casper.then(function( ) {
        test.comment('sending keypress->Y');
        this.sendKeys('body', 'Y');
    });
    casper.then(function( ) {
        test.comment('sending keypress->N');
        this.sendKeys('body', 'N');
    });
    . . .
```

```
casper.run(function( ){
test.done( );
});
});
```
The test file can be replayed by CasperJS, a browser navigation scripting and testing utility or in another browser testing utility application. The replay is automatic and does not require a human operator to be present or to perform any actions. In some embodiments, the recording extension 106 may generate the test file and send the test file to the validation computer 114.

To use the replay to verify a vulnerability, one or more assertions can be added to the test. The assertions can be added automatically. An assertion is performed to confirm that an outcome of the online web application has not changed. For example, the assertion may check for a cross-site scripting (XSS) payload by, for example, adding an assertion that checks for a popup or alert that appears when an XSS injection is attempted during replay. Other assertions may confirm that a final URL in the replay match a final URL in the report 108 or that a final screen shot in the replay match a final screen shot in the report 108. For example, if an XSS payload triggers a popup/alert, when patched, that popup should no longer appear, even when the XSS injection is attempted. In some instances, a researcher or security expert may manually set an assertion.

Returning to the search example above, CasperJS is used to replay the search and confirms the result by virtue of two assertions that, respectively check an intermediate URL and a final URL:

```
$ casperJS/bin/casperjs test events.js ignoresslerrors=yes
Test file: /SRTExtension/replay/events.js
# Exploit Replay
# loading initial URL->http://www.bing.com/PASS
Current url matches the provided pattern
# sending keypress->S
# sending keypress->Y
# sending keypress->N
# sending keypress->A
# sending keypress->C
# sending keypress->K
# opening URL->
http://www.bing.com/
    search?q=synack&go=Submit&qs=n&form=QBLH&
    pq=synack&sc=8-
    6&sp=1&sk=&cvid=00d8d80e5c9b4a6190da8df7b9ba15fa
PASS Current url matches the provided pattern
PASS 2 tests executed in 2.22 s, 2 passed, 0 failed, 0
    dubious, 0 skipped.
```

In embodiments where API calls and/or network traffic are included in the report 108, the report 108 may include information such as:

HTTP Method: GET
HTTP Request URL +Parameters:
  example.com/?msg=Nous%20sommes%
    20Anonymous%20Nous%
    20sommes%20L%C3%A9gion%20Nous%20ne%
    20pardonnons%20pas%20Nous%20n%E2%80%
    99oublions%20pas Using similar techniques, this information is transformed into a rule such as:
rule 12345679 Anonymous attack
  REQUEST_METHOD is GET and
  REQUEST_URI    begins/?msg=Nous%20sommes%
    20Anonymous
    deny Upon verifying the security vulnerability, the validation computer 114 may trigger a separate process or instruction flow that results in notifying a developer computer 132 of the vulnerability. The developer computer 132 may respond with a message indicating that the security vulnerability has been patched. When a security vulnerability has been patched, it can no longer be exploited. The security patch may prevent XSS attacks or other attacks within the online web application 103.

When a security vulnerability is verified, in some embodiments, the researcher associated with the external researcher computer 102 may be rewarded for identifying the security vulnerability. Rewards may include electronic transfers of funds, virtual currency, badges, recognition, or other awards.

Patch validation instructions 118 are programmed, upon receipt of the message indicating that the security vulnerability has been patched, identifies the vulnerability associated with the patch and validates that the patch has closed the vulnerability. The patch validation instructions 118 accesses the test file associated with the vulnerability and replays the test file, including evaluating the assertions included in the test file. If the replay fails, meaning that the outcome of the replay does not match the stored outcome associated with the vulnerability, then the assertions fail, resulting in a conclusion that the patch has successfully closed the vulnerability.

In some embodiments, such as embodiments configured to test for extensible style sheet (XSS) vulnerabilities, the patch validation instructions 118 may use additional techniques to validate the patched online web applications. For example, the patch validation instructions 118 may change the inputs provided to the online web application 103 using a fuzzing technique.

After a security patch is identified but before it is patched, it can still be exploited. Because more than one researcher computer 102 may be working to identify security vulnerabilities associated with the online web application, it may be desirable to prevent the other researchers from finding the same vulnerability to, for example, avoid duplication of labor. In some instances, only the first researcher computer 102 to identify a security vulnerability is rewarded for finding the security vulnerability so subsequent researchers finding the same vulnerability are not rewarded. In these instances, blocking researchers from finding identified vulnerabilities may provide efficiency in operating the researcher computers 102. For example, external researcher computer 126 may be operated by another researcher who is also investigating the same online web application using browser 128 and recording extension 130.

Soft patch generation instructions 120 are programmed to generate a detection script 124 from the test file. The soft patch may be implemented in the Network Layer (Layer 3) or the Application Layer (Layer 7) of the Open Source Interconnection (OSI) model. The test file or a report 108 is converted from a series of function calls causing the browser to take an action to a series of assertions that test whether the browser is performing the same steps previously performed and recorded by another researcher. The soft patch generation instructions 120 may identify, from the report 108 or the test file, a series of API calls, URLs, or network messages that are exchanged as the vulnerability is exposed. In some instances, the API calls are isolated and sequenced. For example, a RegEx function may be used to identify URLs from the report 108. The sequence of events included in the detection script 124 may be manually identified.

The assertions may be automatically generated. Some assertions may include confirming that researcher is directing the browser 128 to a same URL and initiating a same sequence of requests or URLs as those included in the test file. The detection script 124 may include three or more events that are identified in sequence before web traffic is interrupted. In some instances four to six event are identified before network traffic is dropped. If the assertions in the detection script 124 pass, the detection script 124 further includes instructions that cause messages sent to the browser 128 to be dropped before a security vulnerability is exposed.

In an embodiment, an intermediary computer 122 is logically positioned between a firewall and the external researcher computers 102 and 126 such that any communications to or from the external researcher computers 102 and 126 pass through the firewall. The events may be requests received from the external researcher computer 126 or network traffic received from the online web application. The soft patch generation instructions 120 are programmed to generate the detection script 124 and to cause the detection script 124 to be sent to the intermediary computer 122 for execution.

When the detection script 124 is implemented on the intermediary computer 122, the researcher is blocked from identifying already identified security vulnerabilities. For example, if the browser 128 submits four of four events that match a known vulnerability, the event is sent normally because the online web application is not patched. If the vulnerability results in an alert appearing in the browser, the network traffic corresponding to the alert will be dropped by the intermediary computer 122 by virtue of the detection script 124. The alert is not received by the external researcher computer 126 and the vulnerability is not exposed to the researcher. The detection script 124 is effective at blocking the external researcher computer 126 from the vulnerability before an online web application is patched.

3. Method Overview

Figure 2:
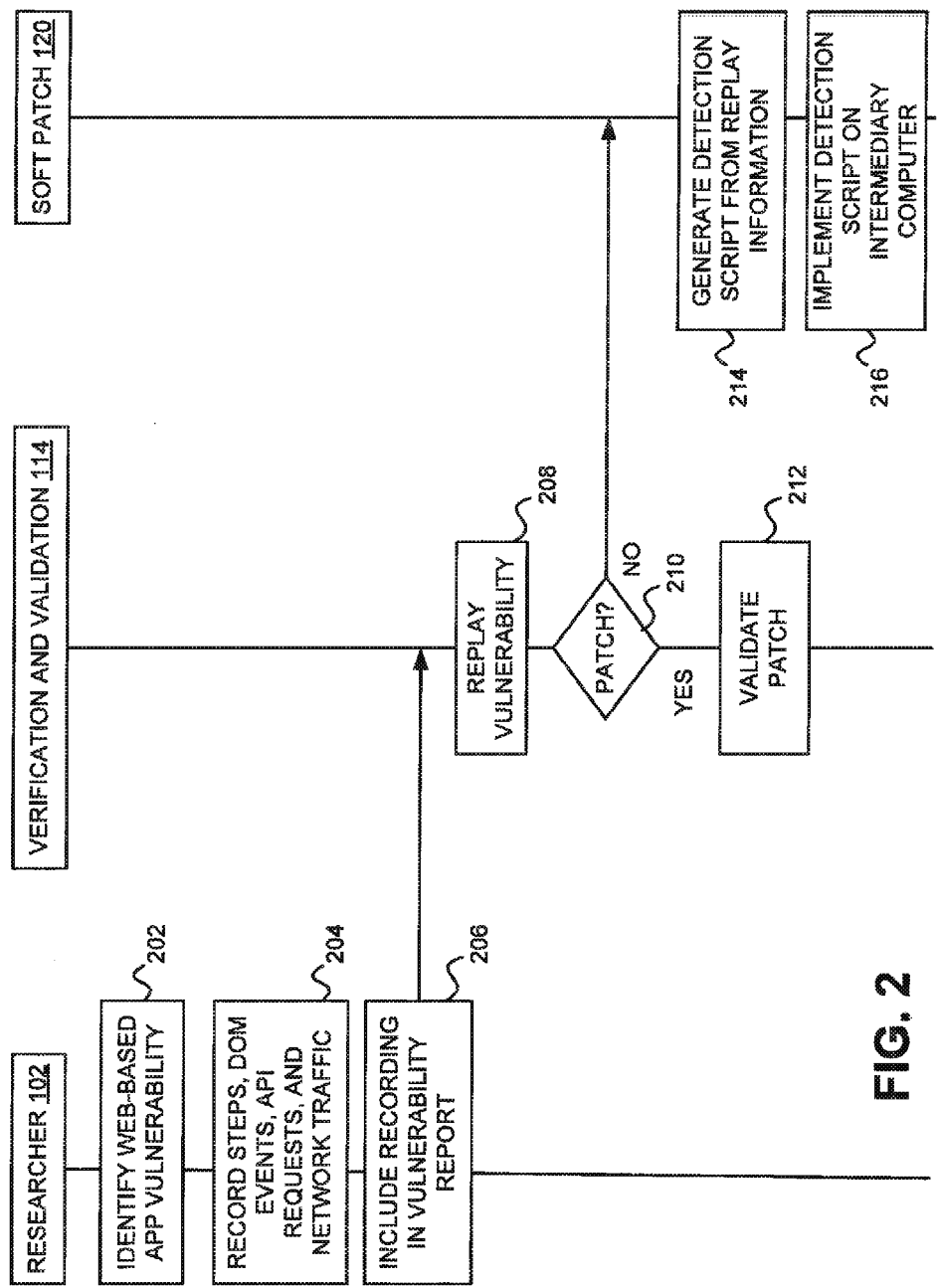
FIG. 2 is a multi-lane flowchart depicting an example method of identifying and verifying a security vulnerability in an online web application, validating a patch, and generating a detection script for the security vulnerability, according to some embodiments.

FIG. 2 is a multi-lane flowchart depicting an example method of identifying and verifying a security vulnerability in an online web application, validating a patch, and generating a detection script 124 for the security vulnerability, according to some embodiments. FIG. 2, and each other flow diagram in this disclosure, is provided to illustrate an example algorithm that can be implemented in executable computer program code for the computers of FIG. 1 as further described in detail with respect to each particular flow diagram. The flow diagrams are provided at the level of detail that is common among persons of ordinary skill to whom this disclosure is directed. In other words, each flow diagram is provided at a level of detail that is commonplace in the art to which this disclosure is directed for persons to communicate about programming, functional operations, and algorithms relevant to the computers, systems and methods that are described, and at a level of detail that is sufficient for skilled persons to transform the flow diagrams into working computer programs. Referring again to FIG. 2, in one embodiment, a method 200 uses the report 108 generated by the researcher to automatically replay the vulnerability, validate patches, and implement a detection script 124 for the vulnerability. This accelerates the identification and patching of security vulnerabilities, making online web applications more secure for everyday users.

In an operation 202, using the browser 104 at the external researcher computer 102, the researcher identifies a security vulnerability in an online web application. Various embodiments of FIG. 2 may be programmed to assess different types of security vulnerabilities including, but not limited to, injection flaws such as SQL injection, broken authentication, XSS, insecure direct object references, security misconfiguration, sensitive data exposure, missing function level access control, cross site request forgery, inclusion of components with known vulnerabilities, and invalidated redirects and forwards. The researcher computer 102 may use various techniques to identify the security vulnerabilities.

In an operation 204, using the recording extension 106, the external researcher computer 102 records the steps, DOM events, API requests, and/or network traffic that have been performed to expose the security vulnerability. The recording extension 106 may be a browser extension that runs in the background continuously recording or may record on command. The recording extension 106 may include various permissions to access the DOM events, API requests, and/or network traffic outputted by the browser or to record screen shots of the online web application.

In an operation 206, the external researcher computer 102 sends the report 108 for validation and verification to validation computer 114. The report 108 includes information including URLs and API calls to the online web application as well as the screen shots, DOM events, API requests, and/or network traffic occurring within or generated by the browser. The report 108 may include time stamps associated with each event. In some instances, the reported 108 may be compressed and/or encrypted before being sent to the validation computer 114.

In an operation 208, the validation computer 114 replays the actions that the researcher computer 102 had performed to expose the vulnerability and had recorded. The validation computer 114 generates a test file from the report 108 that can be executed within the browser 104. The replay may include automatically navigating to a URL, selecting buttons, inputting text, and performing other actions within the online web application. In some instances, to verify the vulnerability, one or more assertions may be added to the test file that are used to confirm that an outcome matches an outcome observed at the external researcher computer 102. When the vulnerability is replayed in a browser, if the new outcome matches the previously observed outcome, the security vulnerability is verified.

In an operation 210, a determination is made as to whether a patch exists for the vulnerability. A patch, in this context, typically comprises an executable combination of an installer and a code snippet that can be executed on a host computer to result in modifying the web application 103 to remove the particular vulnerability. Operation 210 may comprise searching a filesystem, issuing a query to a database system, or executing other machine-implemented techniques directed to testing whether digital file storage systems or databases then currently store a patch for the particular vulnerability. A patch may not exist until several hours or days after a particular vulnerability is reported. Until a patch is provided, the online web application includes the security vulnerability. This may lead other researchers to unnecessarily duplicate the efforts of the researcher who has already identified the vulnerability.

When a patch does exist, in an operation 212, the validation computer 114 validates the patch, based upon the assumption that the existing patch has been installed into the web application 103 to remove or correct the particular vulnerability that is under investigation. The validation computer 114 replays the actions that the researcher computer 102 performed in relation to the patched web application 103, to expose the security vulnerability by executing the test file corresponding to the security vulnerability. If the assertions in the test file fail, then the outcome of replaying the test file does not match the security vulnerability and the security vulnerability has been successfully patched in the instance of the web application 103 that was validated.

When a patch does not exist, or if a patch is not validated, then the soft patch generation instructions 120 are programmed to generate a detection script 124 in operation 214. Detection script 124 is generated from the report 108 or from the test file. The detection script 124 includes three or more automatically generated rules for identifying when a researcher will expose a particular vulnerability, where the three or more rules effectively act as an operational signature for detecting the particular vulnerability. The rules are generated such that when network messages matching the automatically generated rules are received in sequence, network traffic to the external researcher computer 126 is dropped before the researcher can observe the security vulnerability.

In operation 216, the detection script 124 is implemented by the intermediary computer 122. Implementation may include sending the detection script 124 to the intermediary computer 122 with instructions that are effective to install it or cause it to execute. The intermediary computer 122 is logically between a firewall and the external researcher computer 126. When the intermediary computer 122 detects network traffic, it compares the network traffic to a next rule included in the detection script 124 based on whether any previous network traffic has matched other rules included in the detection script 124. When the rules in the detection script 124 are each satisfied, the intermediary computer 122 blocks or drops subsequent network traffic to the external researcher computer 126.

Figure 3:
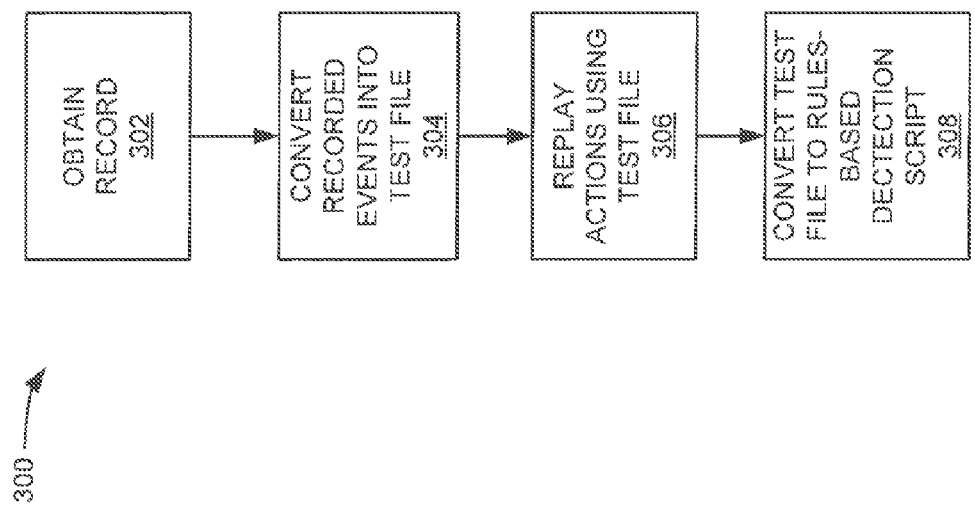
FIG. 3 is a flowchart of an example method of verifying a security vulnerability in an online web application and generating a detection script for the security vulnerability, according to some embodiments.

FIG. 3 is a flowchart of an example method 300 of verifying a security vulnerability in an online web application and generating a detection script 124 for the security vulnerability, according to some embodiments. The method 300 illustrates an algorithm that may be programmed in code executing in validation computer 114 to use the report 108 to perform various functions once it is received by the validation computer 114.

In an operation 302, the validation computer 114 obtains the record 108 from the external researcher computer 102. The record 108 comprises one or more screen shots of the online web application, a record of DOM events including an associated timestamp, URLs of the webpages associated with the online web application, API calls made by the online web application, and network traffic.

In an operation 304, the validation computer 114 converts the recorded events into a test file. The test file comprises a series of instructions that can be executed to replay the action of the researcher in exposing the security vulnerability. The test file optionally includes one or more assertions that can be used to automatically verify the security vulnerability or to validate a patch. The conversion may be performed as discussed in connection with FIG. 1.

In an operation 306, the validation computer 114 replays the actions that are included in the report 108 using the test file. The replay of the actions comprises executing the test file in a browser or other testing software. As part of the replay, the assertions included in the test file are evaluated. Depending on the results of the assertions, a determination may be made regarding whether the security vulnerability has been validated. If the assertions pass, the online web application has not changed since the report was received and the security vulnerability still exists. If the assertions fail, the online web application has been changed since the report was received and the security vulnerability no longer exists. It is noted, however, that an online web application may contain more than one security vulnerability that is not patched by an existing patch and that an existing patch may cause another security vulnerability.

In an operation 308, the validation computer 114 converts the test file to a rules-based detection script 124. The detection script 124 is not used to detect actions at the browser level and instead relies on detecting messages at the network level such as URLs, API calls, and network requests. The test file and/or the report 108 are parsed or edited to identify the network level messages. From those messages, the validation computer 114 automatically generates individual rules that can be used to identify network messages that will potentially expose a security vulnerability. Three or more of the individual rules are sequenced according to timestamp and included in the detection script 124. When the rules are triggered in sequence, the detection script 124 causes the intermediary computer 122 to drop network messages to the external researcher computer 126.

Figure 4:
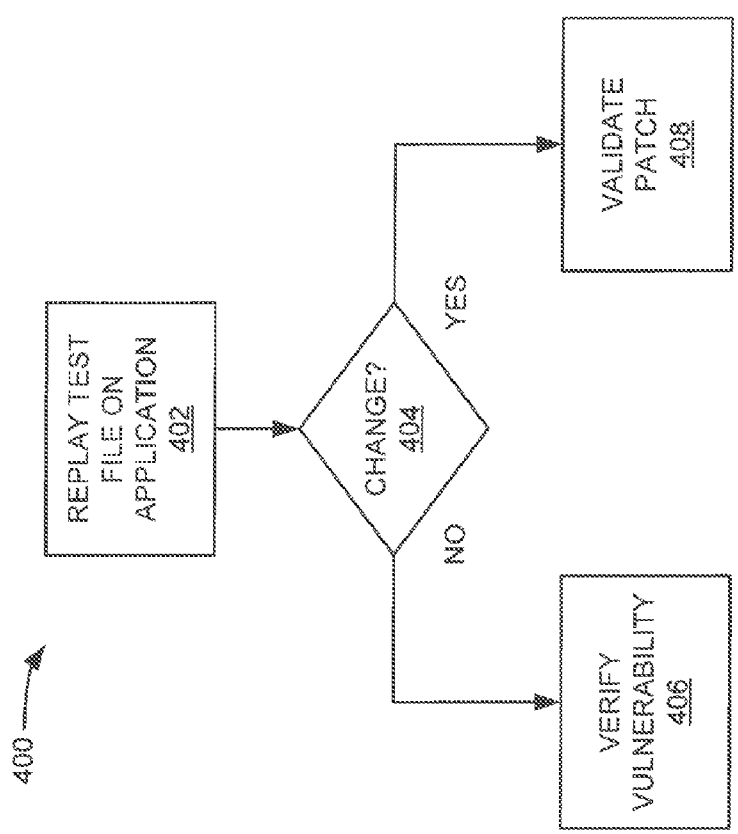
FIG. 4 is a flowchart of an example method of performing patch validation, according to some embodiments.

FIG. 4 is a flowchart of an example method 400 of performing patch validation, according to some embodiments. The method 400 is performed to verify a security vulnerability and/or to validate that a patch closes a security vulnerability using the record 108.

In an operation 402, the validation computer 114 replays the test file on the online web application associated with the test file. The test file having been generated based on the record 108 of a series of interactions with the online web application. The test file causes one or more inputs to be provided to the online web application.

In an operation 404, the validation computer 114 determines if there is a change in the outcomes of the online web application relative to the outcomes of the online web application recorded in the record 108. A change may include a different user interface, an error message or an alert appearing or not appearing, a change in the DOM of the online web application, a URL of the online web application, or some other detectable change.

In an operation 406, if there is no change, that is, if the online web application is acting in the same way as it acted at the time of the record 108, the security vulnerability still exists. In response, the validation computer 114 verifies the security vulnerability. If the validation computer 114 replayed the test file in response to a message indicating that the online web application had been patched, the validation computer 114 may send a reply message indicating that the security vulnerability has not been closed. In some instances, operation 406 may trigger the soft patch generation instructions 120 to generate a detection script 124 for the security vulnerability.

In an operation 408, if there is a change in the outcomes of the online web application, that is, if the online web application is acting differently than it did at the time of the record 108, the security vulnerability has been closed. In response, the validation computer 114, validates a patch associated with the security vulnerability. If the validation computer 114 replayed the test file in response to a message indicating that the online web application had been patched, the validation computer 114 may send a reply message indicating that the security vulnerability has been successfully closed. In some instances, operation 408 may cause a message to be sent to the intermediary computer 122 to remove a detection script 124 for the security vulnerability.

Figure 5:
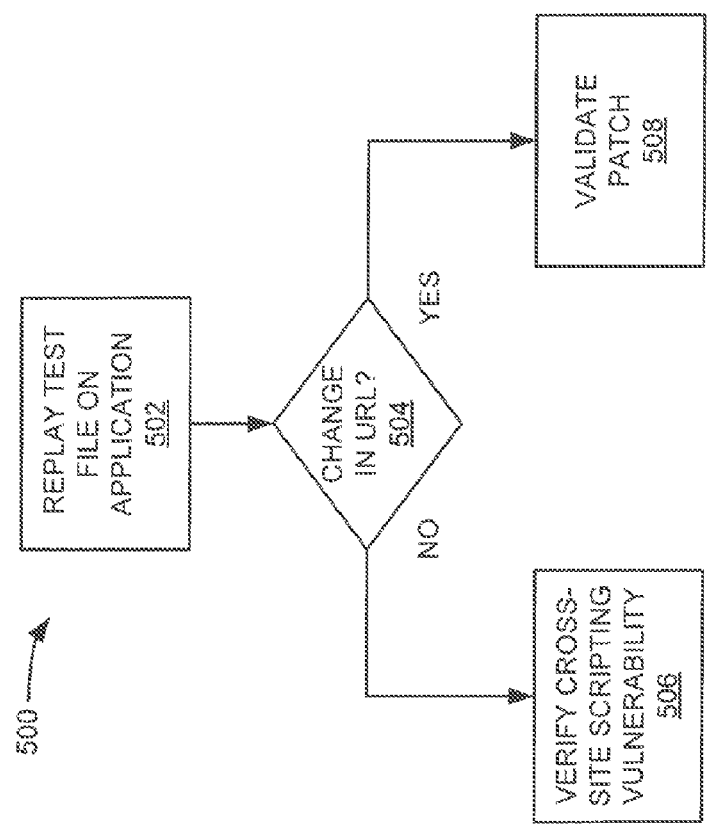
FIG. 5 is a flowchart of an example method of validating a patch in case of a cross-site scripting vulnerability, according to some embodiments.

FIG. 5 is a flowchart of an example method 500 of validating a patch in case of a cross-site scripting vulnerability, according to some embodiments. The method 500 is performed to verify a XSS security vulnerability and/or to validate that a patch closes a XSS security vulnerability using the record 108.

In an operation 502, the validation computer 114 replays the test file on the online web application associated with the test file, which was generated based on the record 108 of a series of interactions with the online web application. The test file causes one or more inputs to be provided to the online web application.

In a XSS attack, a researcher or wrongdoer inputs executable code into a field where executable code is not expected, such as a search field, address field, login or password field, comment field, or the like. Browsers may execute this code, causing a website to expose information such as authorization cookies.

In an operation 404, the validation computer 114 determines if there is a change in the URL associated with the online web application relative to the URL associated with the online web application recorded in the record 108. Other changes may include a redirected invalid request, or a change in a script tag.

In an operation 406, if there is no change, that is, if the online web application is redirecting to the same URL that it did at the time of the record 108, then the XSS security vulnerability still exists. In response, the validation computer 114 verifies the XSS security vulnerability. If the validation computer 114 replayed the test file in response to a message indicating that the online web application had been patched, then the validation computer 114 may send a reply message indicating that the XSS security vulnerability has not been closed. In some instances, operation 406 may trigger the soft patch generation instructions 120 to generate a detection script 124 for the XSS security vulnerability.

In an operation 408, if there is a change in the online web application, that is, if the online web application is no longer redirecting to the URL than it did at the time of the record 108, then the XSS security vulnerability has been closed. In response, the validation computer 114, validates a patch associated with the XSS security vulnerability. If the validation computer 114 replayed the test file in response to a message indicating that the online web application had been patched, then the validation computer 114 may send a reply message indicating that the XSS security vulnerability has been successfully closed. In some instances, operation 408 may cause a message to be sent to the intermediary computer 122 to remove a detection script 124 for the XSS security vulnerability.

Figure 6:
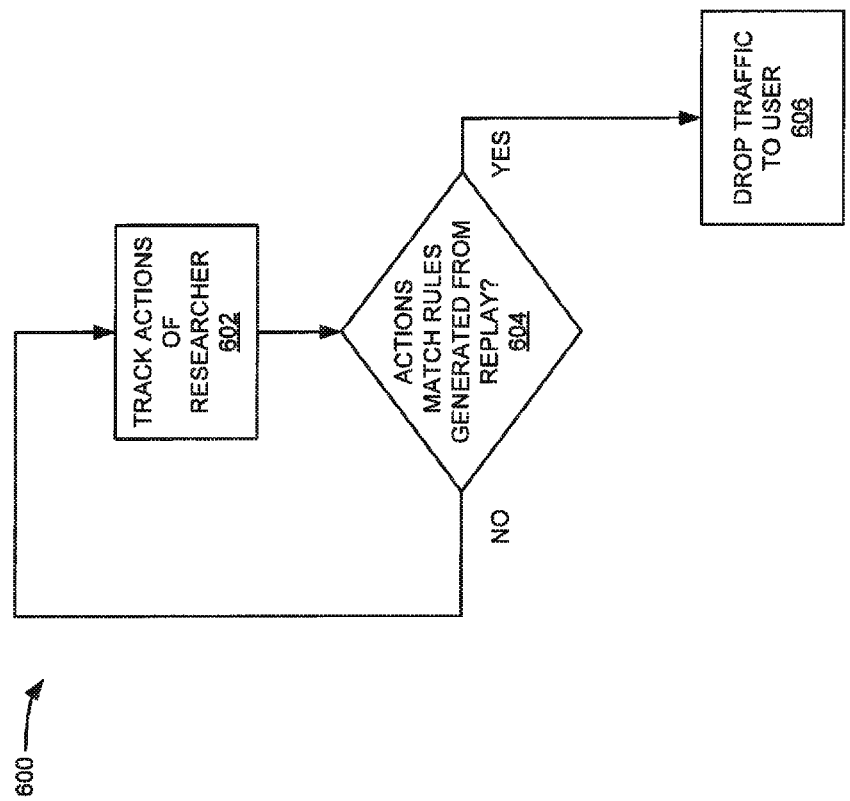
FIG. 6 is a flowchart of an example method of blocking a researcher from detecting a validated vulnerability using a detection script, according to some embodiments.

FIG. 6 is a flowchart of an example method 600 of blocking a researcher from detecting a validated vulnerability using a detection script 124, according to some embodiments. The method 600 is performed by the intermediary computer 122 after a detection script 124 has been generated for a security vulnerability.

In an operation 602, the intermediary computer 602 tracks the actions of the researcher by monitoring network communications sent and received by the external researcher computer 126. The network communications may include requests, API calls, and URLs.

In an operation 604, the intermediary computer 604 determines whether the actions match rules generated from the replay included in the detection script 124. The rules are sequenced so that the intermediary computer is comparing each network communication to a next rule in the detection script 124. If none of the rules in the detection script 124 have been triggered, then the intermediary computer 122 is comparing the network communication to the first rule included in the detection script 124. If one of the rules in the detection script 124 have been triggered, then the intermediary computer 122 is comparing the network communication to the second rule included in the detection script 124. If two of the rules in the detection script 124 have been triggered, then the intermediary computer 122 is comparing the network communication to the third rule included in the detection script 124, and so on.

If not all of the rules have been triggered, then the intermediary computer 122 returns to the operation 602 and continues to track the actions of the researcher.

In an operation 606, if all of the rules in the detection script 124 match actions performed by the researcher, then the intermediary computer drops the next network communications sent to the external researcher computer 126. The next network communication may be an alert or other sign that indicates the existence of the security vulnerability.

4. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
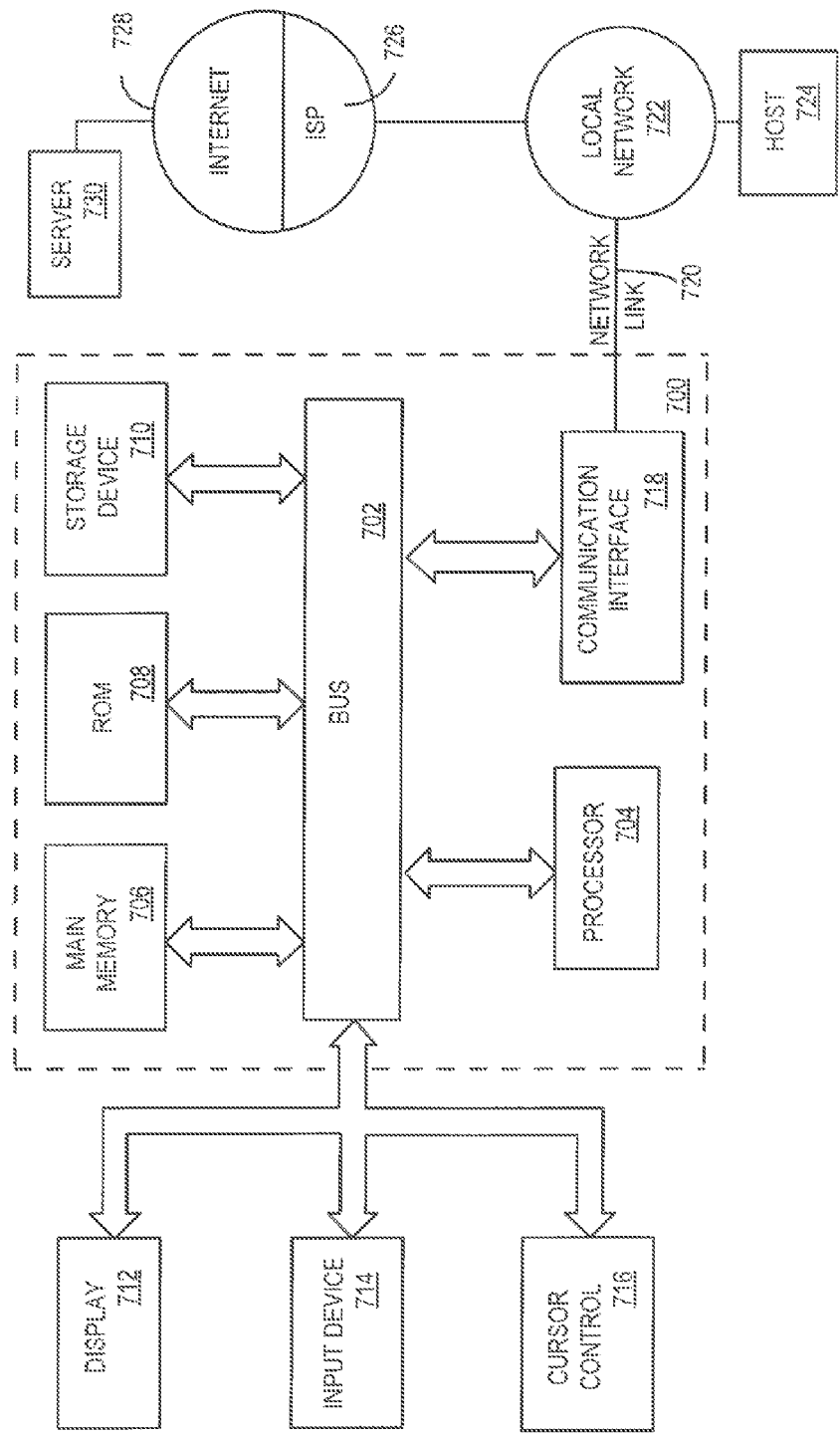
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, from a researcher computer, a report of a potential vulnerability that the researcher computer identified in a computer program application that the researcher computer accessed via a first web browser, the report comprising a screen recording including digital image screens depicting actions performed by the researcher computer that led to the identification of the potential vulnerability, a first outcome of actions, and Document Object Model (DOM) events that the application outputted when the record of actions was generated;
   automatically generating, based on the screen recording including the digital image screens, an executable script from the record of actions, wherein the executable script, when executed, causes a second web browser to perform the actions that are recorded in the record of actions;
   verifying the report of the potential vulnerability by executing the executable script in the second web browser and determining that a second outcome of the actions matches the first outcome that was recorded in the record of actions by evaluating an assertion included in the executable script that specifies the outcome of actions, the result of the evaluation of the assertion being that the second outcome of the actions is the same as the first outcome of the actions;

determining that the first outcome of the actions is associated with a security vulnerability;
receiving a message indicating that the security vulnerability was patched;
executing the executable script in the second web browser, causing a third outcome;
determining that the third outcome of actions is different from the first outcome of the actions recorded in the record of actions; and
validating that the security vulnerability was patched.

2. The method of claim 1, wherein the third outcome of actions comprises an absence of an alert.

3. The method of claim 1, wherein the record of actions comprises digital data for the actions of key presses and x-y coordinates of mouse clicks.

4. The method of claim 1, wherein each of the actions in the record of actions is associated with a different timestamp value.

5. The method of claim 1, wherein generating the executable script from the record of actions comprises generating a CasperJS test file from a JavaScript Object Notation (JSON) file.

6. The method of claim 1, wherein the assertion comprises a uniform resource locator (URL) associated with the computer program application.

7. The method of claim 1, wherein the assertion comprises a screenshot of a user interface associated with the computer program application.

8. The method of claim 1, wherein the assertion comprises an alert associated with the computer program application.

9. The method of claim 1, wherein the security vulnerability comprises a cross-site scripting attack.

10. The method of claim 1, wherein the first outcome recorded in the record of actions comprises an alert.

11. The method of claim 1, wherein the computer program application that is accessed via the first web browser is a JavaScript application.

12. The method of claim 1, wherein the record further comprises one or more uniform resource locators (URLs) associated with the computer program application.

13. The method of claim 1, wherein verifying the report of the potential vulnerability by executing the executable script in a second web browser comprises performing a fuzzing technique on one or more inputs to the computer program application.

14. A system comprising:
one or more processors;
computer memory coupled to the one or more processors and storing one or more sequences of instructions which when executed by the one or more processors cause:
receiving, from a researcher computer, a report of a potential vulnerability that the researcher computer identified in a computer program application that the researcher computer accessed via a first web browser, the report comprising a screen recording including digital image screens depicting actions performed by the researcher computer that led to the identification of the potential vulnerability, a first outcome of actions, and Document Object Model (DOM) events that the application outputted when the record of actions was generated;
automatically generating, based on the screen recording including the digital image screens, an executable script from the record of actions, wherein the executable script, when executed, causes a second web browser to perform the actions that are recorded in the record of actions;
verifying the report of the potential vulnerability by executing the executable script in the second web browser and determining that a second outcome of the actions matches the first outcome that was recorded in the record of actions by evaluating an assertion included in the executable script that specifies the outcome of actions, the result of the evaluation of the assertion being that the second outcome of the actions is the same as the first outcome of the actions;
determining that the first outcome of the actions is associated with a security vulnerability;
receiving a message indicating that the security vulnerability was patched;
executing the executable script in the second web browser, causing a third outcome;
determining that the third outcome of actions is different from the first outcome of the actions recorded in the record of actions; and
validating that the security vulnerability was patched.

* * * * *